(12) United States Patent
Yamase (10) Patent No.: US 12,487,447 B2
(45) Date of Patent: Dec. 2, 2025

(54) DISPLAY DEVICE FOR VEHICLE (71) Applicant: YAZAKI CORPORATION, Tokyo (JP)

(72) Inventor: Takafumi Yamase, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 329 days.

(21) Appl. No.: 18/335,108

(22) Filed: Jun. 14, 2023

(65) Prior Publication Data

US 2024/0012235 A1   Jan. 11, 2024

(30) Foreign Application Priority Data

Jul. 7, 2022   (JP) ................. 2022-109534

(51) Int. Cl.
  *G02B 26/06*  (2006.01)
  *B60K 35/231*  (2024.01)
  *B60K 35/40*  (2024.01)
  *B60K 35/60*  (2024.01)
  *B60K 35/81*  (2024.01)
  *G02B 27/01*  (2006.01)

(52) U.S. Cl.
  CPC ............ *G02B 26/06* (2013.01); *B60K 35/231* (2024.01); *B60K 35/40* (2024.01); *B60K 35/81* (2024.01); *G02B 27/0101* (2013.01); *B60K 35/60* (2024.01); *B60K 2360/23* (2024.01); *B60K 2360/25* (2024.01); *B60K 2360/785* (2024.01)

(58) Field of Classification Search
  CPC ........ G02B 26/06; B60K 35/81; B60K 35/40; B60K 35/231
  See application file for complete search history.

(56) References Cited

U.S. PATENT DOCUMENTS

| 10,254,551 B2 * | 4/2019 | Kishigami ......... G02B 27/0101 |
| 2004/0017282 A1 * | 1/2004 | Eguchi ................... G02B 27/01 |
| | | 340/425.5 |
| 2008/0088573 A1 * | 4/2008 | Kim .................. G02F 1/133603 |
| | | 345/102 |
| 2022/0020330 A1 * | 1/2022 | Cao ...................... G09G 3/3258 |

FOREIGN PATENT DOCUMENTS

| CN | 204360017 U | * | 5/2015 |
| JP | 2019-108088 A | | 7/2019 |

\* cited by examiner

*Primary Examiner* — Lucy P Chien
(74) *Attorney, Agent, or Firm* — KENEALY VAIDYA LLP

(57) ABSTRACT

A display device for a vehicle includes: a display, a polarization switching unit, a reflector, and a controller. The polarization switching unit includes a wave plate that can cause emission light of the display to be emitted while changing a polarization direction thereof, and a drive device that can rotate the wave plate between a position of not using polarizing sunglasses and a position of using polarizing sunglasses. The controller rotates the wave plate within a prescribed range, detects luminance values for each fixed rotation angle of the wave plate within a prescribed range from imaging information of an imaging device that transmits a principal component of transmitted light of the wave plate at a position of the eye box, and sets, as a correction angle, a rotation angle of the wave plate corresponding to a maximum luminance value among the luminance values.

8 Claims, 7 Drawing Sheets

| | RELATIVE ROTATION ANGLE | LUMINANCE VALUE (INDEX VALUE) |
|---|---|---|
| PHOTOMETRY STARTING POSITION | -15 | 100 |
| | -14 | 109 |
| | ⋮ | ⋮ |
| | -2 | 190 |
| | -1 | 197 |
| DESIGN VALUE | ±0 | 204 |
| | +1 | 211 |
| | +2 | 218 |
| | +3 | 224 |
| | +4 | 230 |
| | +5 | 235 |
| | +6 | 242 |
| | +7 | 247 |
| | +8 | 251 |
| | +9 | 255 |
| | +10 | 255 |
| | +11 | 255 |
| | +12 | 255 |
| | +13 | 253 |
| | +14 | 250 |
| PHOTOMETRY COMPLETED POSITION | +15 | 245 |

FIG.7

DISPLAY DEVICE FOR VEHICLE

CROSS-REFERENCE TO RELATED APPLICATION(S)

The present application claims priority to and incorporates by reference the entire contents of Japanese Patent Application No. 2022-109534 filed in Japan on Jul. 7, 2022.

BACKGROUND OF THE INVENTION

1. Field of the Invention

The present invention relates to a display device for a vehicle.

2. Description of the Related Art

Conventionally, a display device for a vehicle that displays information provided to an occupant in a compartment is mounted on a vehicle. For example, as the display device for a vehicle, there is known what is called a head-up display device that causes emission light related to display information to be emitted toward a windshield or a combiner, and causes the emission light to be reflected from the windshield and the like toward the occupant to cause the occupant to visually recognize the display information as a virtual image. In such a type of the display device for a vehicle, reflected light containing S polarized light as a principal component is reflected from the windshield and the like toward the occupant. Due to this, when the occupant is wearing polarizing sunglasses, the S polarized light is cut by the polarizing sunglasses, so that visibility of the virtual image is lowered such that luminance of the virtual image is lowered as compared with a case in which the occupant is not wearing the polarizing sunglasses. For example, Japanese Patent Application Laid-open No. 2019-108088 described below discloses a technique in which the display device for a vehicle switches a polarization direction of emission light of a display between the time of using polarizing sunglasses and the time of not using polarizing sunglasses, and reflects reflected light of a polarized component that can be transmitted through the polarizing sunglasses at the time when the polarizing sunglasses are used.

In the conventional display device for a vehicle, a wave plate on which the emission light is incident is driven to rotate by an electric motor to switch the polarization direction of the emission light of the display between the time of using polarizing sunglasses and the time of not using polarizing sunglasses. Due to this, in this display device for a vehicle, if a rotational position of the wave plate is deviated, quality of the virtual image at the time of using the polarizing sunglasses may be deteriorated. For example, in the display device for a vehicle, there are tolerance variations in various components such as a wave plate and a drive device that causes the wave plate to rotate, and assembly variations within a tolerance range thereof, so that there is the possibility that an optimum principal component is not transmitted at the time of using polarizing sunglasses and the time of not using polarizing sunglasses.

SUMMARY OF THE INVENTION

Thus, the present invention aims at providing a display device for a vehicle that may suppress deterioration of virtual image quality.

In order to solve the above mentioned problem and achieve the object, a display device for a vehicle according to one aspect of the present invention includes a display configured to emit, as display light, display information to be visually recognized as a virtual image by an occupant in a compartment; a polarization switching unit configured to emit emission light from the display while switching a polarization direction between a mode of not using polarizing sunglasses in which the occupant is not using polarizing sunglasses and a mode of using polarizing sunglasses in which the occupant is using polarizing sunglasses; a reflector configured to directly or indirectly receive the emission light from the polarization switching unit, and reflect the emission light toward an eye box as a visible range for a virtual image of the occupant; and a controller configured to control operation of the display and the polarization switching unit, wherein the polarization switching unit includes: a wave plate configured to be able to emit emission light of the display while changing a polarization direction; and a drive device using an electric motor driven and controlled by the controller as a driving source and configured to be able to rotate the wave plate between a position of not using polarizing sunglasses in the mode of not using polarizing sunglasses and a position of using polarizing sunglasses in the mode of using polarizing sunglasses, causes transmitted light containing an S polarization component as a principal component to be emitted from the wave plate at the position of not using polarizing sunglasses, and causes transmitted light containing a P polarization component as a principal component to be emitted from the wave plate at the position of using polarizing sunglasses, and the controller rotates the wave plate within a prescribed range before and after any one of the position of not using polarizing sunglasses and the position of using polarizing sunglasses, detects luminance values for each fixed rotation angle of the wave plate within the prescribed range from imaging information of an imaging device that transmits, at a position of the eye box, a principal component of transmitted light on the wave plate at this one rotational position, and sets, as a correction angle, a rotation angle of the wave plate corresponding to a maximum luminance value among the luminance values.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes an embodiment of a display device for a vehicle according to the present invention in detail based on the drawings. The present invention is not limited to the embodiment.

Embodiment

The following describes one embodiment of the display device for a vehicle according to the present invention based on FIG. 1 to FIG. 7.

Figure 1:
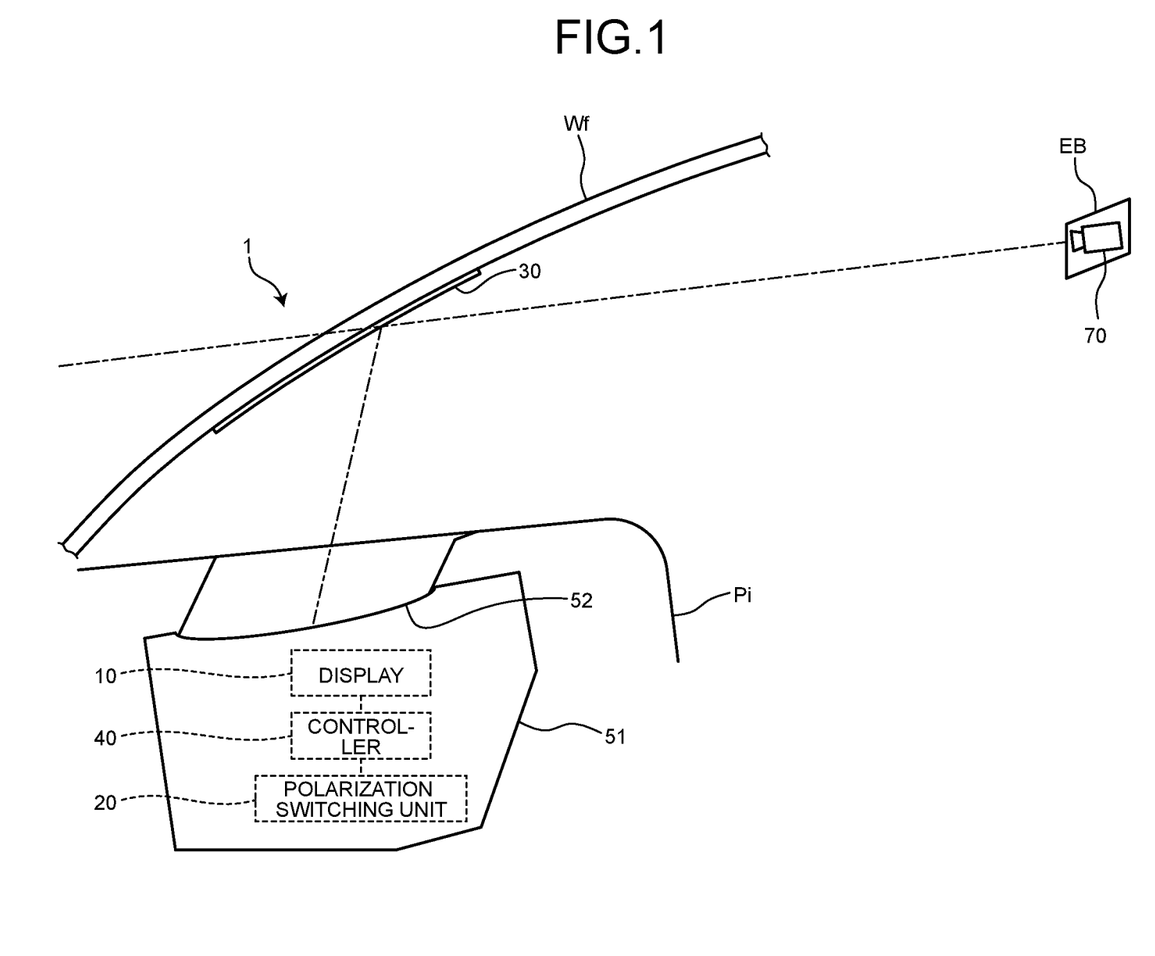
FIG. 1 is a schematic diagram illustrating a display device for a vehicle according to an embodiment.

The reference numeral 1 in FIG. 1 denotes the display device for a vehicle according to the embodiment. The display device 1 for a vehicle is what is called a head-up display device that displays information provided to an occupant in a compartment of a vehicle (such as an automobile) as a virtual image.

The display device 1 for a vehicle causes projection light related to display information to be reflected by a windshield and the like of the vehicle toward the occupant to cause the occupant to visually recognize a virtual image of the display information. Herein, a P polarization component is hardly reflected by the windshield as compared with an S polarization component, so that a principal component of reflected light toward the occupant is S polarized light. On the other hand, a main purpose of polarizing sunglasses that may be used by the occupant is to cut the S polarized light. Due to this, luminance of the virtual image is lowered at the time of using the polarizing sunglasses as compared with the time of not using the polarizing sunglasses. Thus, the display device 1 for a vehicle is configured as described below, and visibility of the virtual image at the time of using the polarizing sunglasses is improved by reducing a difference in luminance of the virtual image between the time when the occupant is not using the polarizing sunglasses and the time when the occupant is using the polarizing sunglasses.

The display device 1 for a vehicle includes a display 10 that emits, as display light, display information to be visually recognized as a virtual image by the occupant in the compartment; a polarization switching unit 20 that causes emission light from the display 10 to be emitted while switching a polarization direction between a mode of not using polarizing sunglasses in which the occupant is not using the polarizing sunglasses and a mode of using polarizing sunglasses in which the occupant is using the polarizing sunglasses; and a reflector 30 that directly or indirectly receive the emission light from the polarization switching unit 20, and reflects the emission light toward an eye box EB as a visible range of the virtual image for the occupant (FIG. 1). The display device 1 for a vehicle further includes a controller 40 that controls operation of the display 10 and the polarization switching unit 20 (FIG. 1).

The display device 1 for a vehicle includes a housing 51 housing the display 10, the polarization switching unit 20, and the controller 40 inside, and a transparent cover 52 that closes an opening of the housing 51 (FIG. 1). The housing 51 is housed in an instrument panel Pi in the compartment in a state in which the cover 52 is exposed (FIG. 1). In the display device 1 for a vehicle, the emission light from the polarization switching unit 20 is directly or indirectly emitted to the outside of the instrument panel Pi via the cover 52 to be projected on the reflector 30 that is present ahead.

For example, the display 10 is configured to cause emission light of a light source (not illustrated) as backlight to be incident on a back surface, and to cause display light corresponding to the incident light from the back surface to be emitted from a front surface. For example, as the display 10, a light transmissive Thin Film Transistor Liquid Crystal Display (TFT liquid crystal) or the like is used. The display 10 displays, for example, image information such as characters, numerals, and figures as display information. The controller 40 controls the display 10 to execute display control for the display information.

For example, the reflector 30 is a windshield (herein, a front windshield Wf) itself. In this case, the windshield (front windshield Wf) as the reflector 30 directly or indirectly receives emission light from the polarization switching unit 20, and reflects the emission light from the windshield (front windshield Wf) toward the eye box EB.

Alternatively, the reflector 30 may be disposed on the windshield (front windshield Wf). The reflector 30 is formed as a half mirror that directly or indirectly receives emission light from the polarization switching unit 20 by a reflection surface to be reflected toward the eye box EB, and causes light from the outside of the vehicle to be emitted toward the occupant side. For example, the reflector 30 is formed in a film shape along a curved surface shape of the windshield (front windshield Wf), and is bonded to a wall surface on a vehicle interior side of the windshield with a bonding agent. Alternatively, the reflector 30 may be formed in a film shape along the curved surface shape of the windshield (front windshield Wf), and encapsulated in the windshield as laminated glass together with an interlayer. The reflector 30 may also be a coat that is coated by being applied to the wall surface on the vehicle interior side of the windshield (front windshield Wf).

The reflector 30 may also be a combiner that is arranged to be closer to the occupant than the windshield (front windshield Wf).

Figure 2:
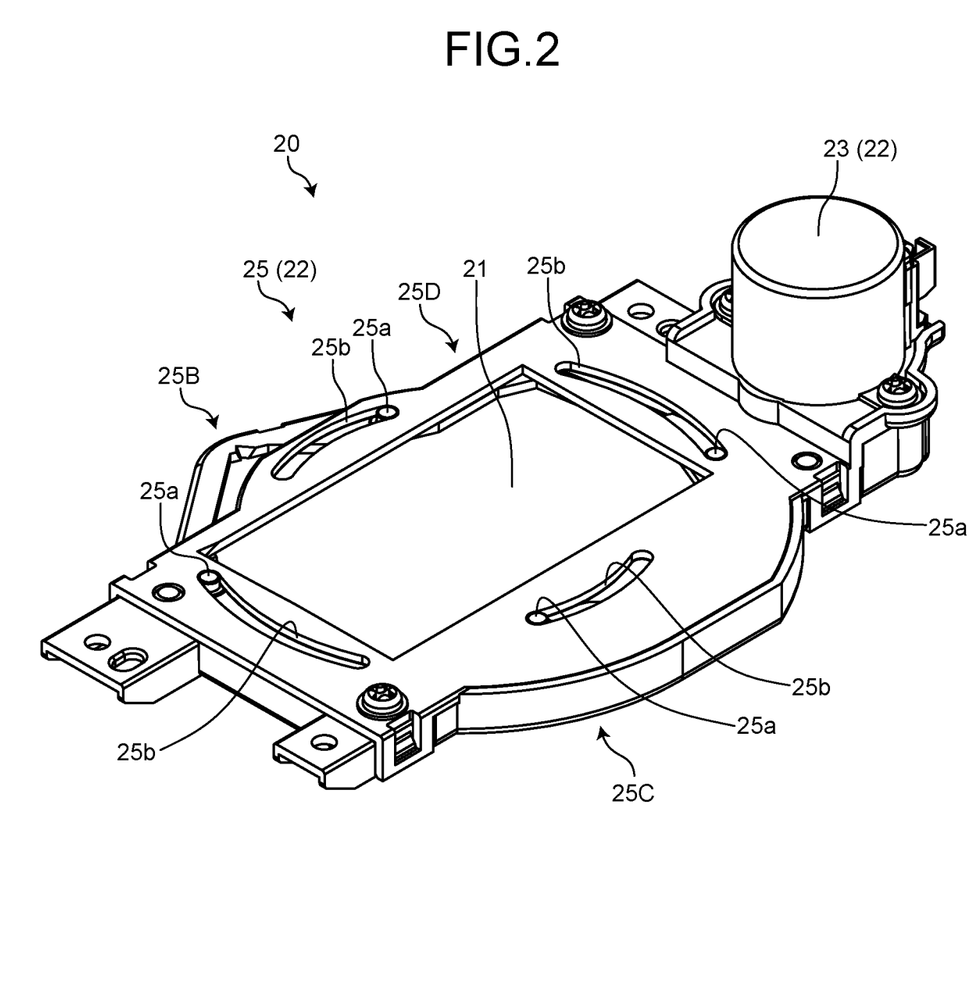
FIG. 2 is a perspective view illustrating a polarization switching unit.
Figure 3:
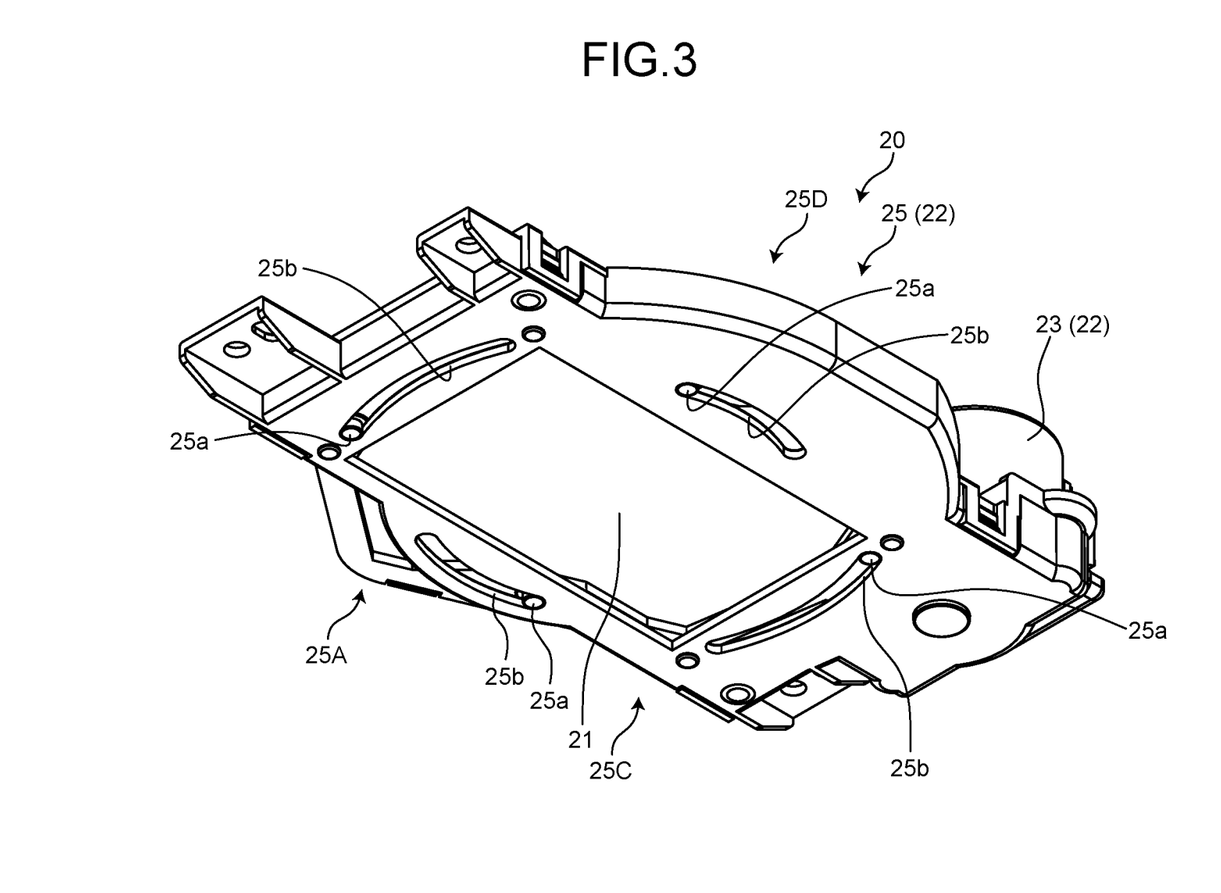
FIG. 3 is a perspective view of viewing the polarization switching unit from a different angle.
Figure 4:
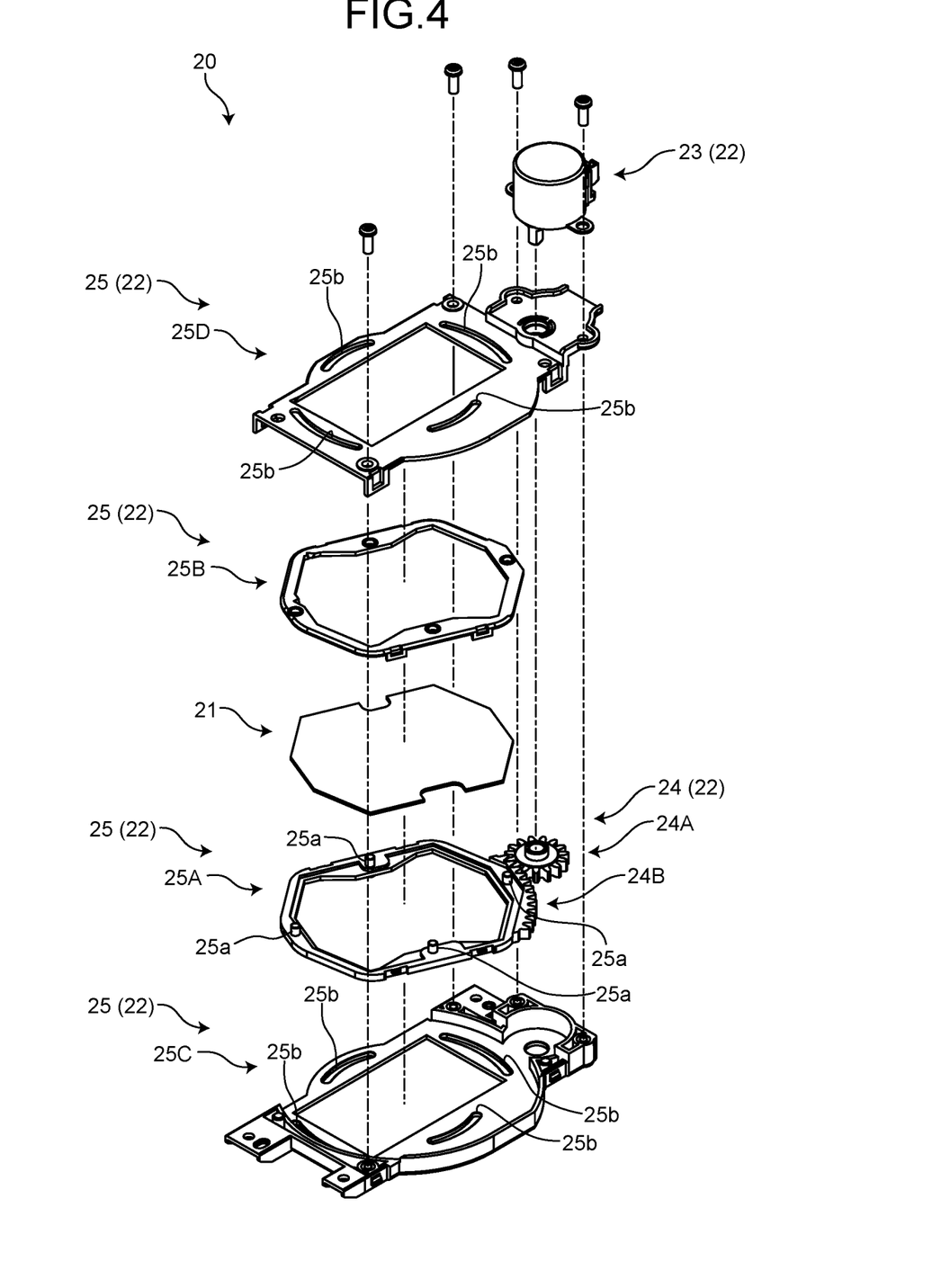
FIG. 4 is an exploded perspective view illustrating the polarization switching unit.

The polarization switching unit 20 includes a wave plate 21 that can change a polarization direction of emission light of the display 10 to be emitted, and a drive device 22 that can cause the wave plate 21 to rotate between a position of not using polarizing sunglasses in a mode of not using polarizing sunglasses and a position of using polarizing sunglasses in a mode of using polarizing sunglasses (FIG. 2 to FIG. 4). The polarization switching unit 20 may directly direct emission light from the wave plate 21 to the reflector 30, or may reflect the emission light from the wave plate 21 by a reflection member such as a magnifying mirror to indirectly direct the emission light to the reflector 30.

The polarization switching unit 20 causes transmitted light containing an S polarization component as a principal component to be emitted from the wave plate 21 at the position of not using polarizing sunglasses, and causes transmitted light containing a P polarization component as a principal component to be emitted from the wave plate 21 at the position of using polarizing sunglasses. That is, the polarization switching unit 20 causes projection light containing the S polarization component as a principal component to be projected on the reflector 30 when the rotational position of the wave plate 21 is the position of not using polarizing sunglasses while causing projection light containing the P polarization component as a principal component to be projected on the reflector 30 when the rotational position of the wave plate 21 is the position of using polarizing sunglasses.

Thus, the emission light of the display 10 that has been incident is transmitted through the wave plate 21 so that the principal component of projection light (emission light from the polarization switching unit 20) to be projected on the reflector 30 is the S polarization component when the rotational position is the position of not using polarizing sunglasses. The emission light of the display 10 that has been incident is then transmitted through the wave plate 21 so that the principal component of projection light (emission light from the polarization switching unit 20) to be projected on the reflector 30 is the P polarization component when the rotational position is the position of using polarizing sunglasses.

The wave plate 21 is well-known in this kind of technical field, and a half-wave plate is used herein.

For example, in a case in which the emission light of the display 10 is S polarized light, the rotational position of the wave plate 21 the fast axis of which is aligned with a polarization direction of the emission light of the display 10 is the position of not using polarizing sunglasses. The emission light of the display 10 is transmitted through the wave plate 21 while keeping the polarization direction when the rotational position is the position of not using polarizing sunglasses. Due to this, the projection light containing the S polarization component as a principal component is emitted from the polarization switching unit 20 to the reflector 30 when the rotational position of the wave plate 21 is the position of not using polarizing sunglasses.

The fast axis of the wave plate 21 is deviated from the polarization direction of the emission light of the display 10 by 45 degrees when the wave plate 21 is rotated from the position of not using polarizing sunglasses by 45 degrees, so that the emission light of the display 10 that has been incident is rotated by an angle of two times 45 degrees (90 degrees) to be emitted as transmitted light of P polarization. Due to this, projection light containing the P polarization component as a principal component is emitted from the polarization switching unit 20 to the reflector 30 when the wave plate 21 is rotated from the position of not using polarizing sunglasses by 45 degrees. Thus, the rotational position of the wave plate 21 rotated from the position of not using polarizing sunglasses by 45 degrees is the position of using polarizing sunglasses.

In a case in which the principal component of the emission light of the display 10 is not the S polarization component, arrangement of the wave plate 21 at the position of not using polarizing sunglasses may be replaced with the following arrangement. The fast axis of the wave plate 21 is deviated from the polarization direction of the emission light of the display 10 by a predetermined angle θ, and the polarization direction of the emission light of the display 10 is rotated by an angle of two times θ (2θ) to cause the rotational position at which the transmitted light of S polarization is emitted to be the position of not using polarizing sunglasses. Due to this, the projection light containing the S polarization component as a principal component is emitted from the polarization switching unit 20 to the reflector 30 when the rotational position of the wave plate 21 is the position of not using polarizing sunglasses.

The fast axis of the wave plate 21 is deviated from the polarization direction of the emission light of the display 10 by θ+45 degrees when the wave plate 21 is rotated from the position of not using polarizing sunglasses by 45 degrees, so that the emission light of the display 10 that has been incident is rotated by an angle of two times θ+45 degrees (2θ+90 degrees) to be emitted as transmitted light of P polarization. Due to this, projection light containing the P polarization component as a principal component is emitted from the polarization switching unit 20 to the reflector 30 when the wave plate 21 is rotated from the position of not using polarizing sunglasses by 45 degrees. Thus, the rotational position of the wave plate 21 rotated from the position of not using polarizing sunglasses by 45 degrees is the position of using polarizing sunglasses.

That is, regarding the wave plate 21, even if the position of not using polarizing sunglasses is set to be any of the positions, the projection light containing the S polarization component as a principal component is emitted from the polarization switching unit 20 toward the reflector 30 at the position of not using polarizing sunglasses. Due to this, the display device 1 for a vehicle can enable the occupant not wearing polarizing sunglasses to visually recognize a virtual image. By rotating the wave plate 21 from the position of not using polarizing sunglasses to the position of using polarizing sunglasses by 45 degrees, the projection light containing the P polarization component as a principal component is emitted from the polarization switching unit 20 toward the reflector 30. Due to this, the display device 1 for a vehicle can enable the occupant wearing polarizing sunglasses to visually recognize the virtual image.

The drive device 22 uses, as a driving source, an electric motor 23 (FIG. 2 to FIG. 4) driven and controlled by the controller 40, and causes the wave plate 21 to rotate about a rotation axis orthogonal to a plane thereof (a plane on which the emission light of the display 10 is incident, a plane through which the incident light is transmitted to be emitted). The drive device 22 includes a power transmission mechanism 24 (FIG. 4) that transmits output torque of the electric motor 23 to the wave plate 21, and a holding mechanism 25 (FIG. 2 to FIG. 4) that holds a peripheral part of the wave plate 21 in a rotatable manner.

In the drive device 22 described herein, a stepping motor is used as the electric motor 23, and output torque thereof is transmitted to the wave plate 21 via a gear wheel group as the power transmission mechanism 24. The power transmission mechanism 24 includes a pinion gear 24A having a spur gear shape concentrically arranged on an output shaft of the electric motor 23, and a rack 24B arranged on a peripheral part of the wave plate 21 to be meshed with the pinion gear 24A (FIG. 4).

The holding mechanism 25 includes an annular first guide member 25A and an annular second guide member 25B that surround the peripheral part of the wave plate 21 in a circumferential direction, and a first holding member 25C and a second holding member 25D that hold the wave plate 21 in a rotatable manner via the first guide member 25A and the second guide member 25B (FIG. 2 to FIG. 4).

The first guide member 25A and the second guide member 25B are annular members that sandwich and hold the peripheral part of the wave plate 21 in a state of being assembled to each other, and expose both planes of the wave plate 21. At least one of the first guide member 25A and the second guide member 25B includes a cylindrical guide projection 25a arranged on a parallel axis with respect to the rotation axis of the wave plate 21 (FIG. 2 to FIG. 4). In the holding mechanism 25, a plurality of pairs of (herein, four pairs of) the guide projections 25a projecting in opposite directions on the parallel axis are disposed at intervals in a rotation direction of the wave plate 21. For example, the pair of guide projections 25a are cylindrical projections projecting in opposite directions from an annular main body of any one of the first guide member 25A and the second guide member 25B, and a plurality of the pairs thereof are disposed at intervals in the circumferential direction on each annular main body. For example, the pair of guide projections 25a are a cylindrical projection projecting from the annular main body of the first guide member 25A and a cylindrical projection projecting from the annular main body of the second guide member 25B in the opposite direction, and a plurality of the pairs thereof are disposed at intervals in the circumferential direction on each of the annular main bodies. Herein, all of the guide projections 25a are disposed on the first guide member 25A.

Herein, the rack 24B is disposed on a peripheral part of any one of the first guide member 25A and the second guide member 25B. The rack 24B may be formed integrally with the peripheral part of a main body of any one of the first guide member 25A and the second guide member 25B, or may be formed as a separate component to be fixed to the peripheral part thereof. Herein, the rack 24B is formed integrally with the peripheral part of the annular main body of the first guide member 25A as a portion of the first guide member 25A (FIG. 4).

The first holding member 25C and the second holding member 25D, which are assembled to each other, hold the wave plate 21 in a rotatable manner via the first guide member 25A and the second guide member 25B. The first holding member 25C and the second holding member 25D hold the first guide member 25A and the second guide member 25B in a rotatable manner while exposing both planes of the wave plate 21.

The first holding member 25C is formed as a housing member that houses and holds the wave plate 21, the first guide member 25A, and the second guide member 25B in a rotatable manner. The first holding member 25C described herein is caused to also house and hold the power transmission mechanism 24 in an operable manner. The second holding member 25D is like a cover member that covers an opening of the first holding member 25C while exposing the wave plate 21, and holds the wave plate 21, the first guide member 25A, and the second guide member 25B in a rotatable manner. The electric motor 23 is fixed to the second holding member 25D.

The first holding member 25C includes a guide rail 25b having a through hole shape or a groove shape that houses and guides one of the pair of guide projections 25a for each pair of the guide projections 25a (FIG. 2 and FIG. 4). Similarly, the second holding member 25D includes the guide rail 25b having a through hole shape or a groove shape that houses and guides the other one of the pair of guide projections 25a for each pair of the guide projections 25a (FIG. 3 and FIG. 4). The guide rail 25b described herein is formed in a through hole shape. At the time of rotating the wave plate 21 between the position of not using polarizing sunglasses and the position of using polarizing sunglasses, a pair of the guide rails 25b opposed to each other in an axial direction of the rotation axis of the wave plate 21 guides the pair of guide projections 25a along a rotation locus thereof.

The pair of guide projections 25a and the pair of guide rails 25b described herein are formed to be able to be rotated at least by an angle equal to or larger than a rotation angle between the position of not using polarizing sunglasses and the position of using polarizing sunglasses (that is, at least an angle equal to or larger than 45 degrees) from one end to the other end of the guide rail 25b for each combination thereof.

In the polarization switching unit 20, the position of not using polarizing sunglasses is assumed to be an origin of the rotational position of the wave plate 21. For example, herein, the rotational position of the wave plate 21 at the time when the guide projection 25a is arranged at one end side of the guide rail 25b is assumed to be the origin.

The controller 40 drives and controls the electric motor 23 of the drive device 22 depending on whether a required visual recognition mode is the mode of not using polarizing sunglasses or the mode of using polarizing sunglasses, and performs rotational position control for the wave plate 21. For example, the controller 40 determines that there is a switching command for the required visual recognition mode to the mode of not using polarizing sunglasses or the mode of using polarizing sunglasses based on a switching command signal for the required visual recognition mode caused by a switching operation for a required visual recognition mode switching switch by the occupant, a pressing operation or a touch operation for a required visual recognition mode setting button, and the like, and determines whether the required visual recognition mode is the mode of not using polarizing sunglasses or the mode of using polarizing sunglasses.

When a command is given to switch the required visual recognition mode to the mode of not using polarizing sunglasses or the mode of using polarizing sunglasses, the controller 40 supplies an exciting current to the electric motor 23 to rotate the wave plate 21 to the rotational position of the required visual recognition mode. When the required visual recognition mode is the mode of not using polarizing sunglasses, the controller 40 drives and controls the electric motor 23 of the drive device 22 to rotate the wave plate 21 to the position of not using polarizing sunglasses. Additionally, when the required visual recognition mode is the mode of using polarizing sunglasses, the controller 40 drives and controls the electric motor 23 of the drive device 22 to rotate the wave plate 21 to the position of using polarizing sunglasses.

In the display device 1 for a vehicle, the polarization switching unit 20 is obtained by assembling a plurality of components to each other, so that there are tolerance variations in the respective components and assembly variations within a tolerance range of each of the components. Additionally, in the display device 1 for a vehicle, there is assembly variations within a tolerance range between the display 10 and the polarization switching unit 20. Thus, in the display device 1 for a vehicle, when the rotational position of the wave plate 21 is deviated from a design value even within a range of tolerance variation, there is the possibility that S polarized light having the maximum luminance at the position of not using polarizing sunglasses is not emitted from the polarization switching unit 20 and P polarized light having the maximum luminance at the position of using polarizing sunglasses is not emitted from the polarization switching unit 20.

Thus, the display device 1 for a vehicle is configured to be able to correct position deviation of the rotational position of the wave plate 21. In the display device 1 for a vehicle, a correction angle for the rotational position of the wave plate 21 is previously obtained at the time of manufacture or the time of maintenance of the vehicle, and the correction angle is reflected at the time of actually rotating the wave plate 21 to the position of not using polarizing sunglasses or the position of using polarizing sunglasses.

Specifically, at the time of obtaining the correction angle, the controller 40 rotates the wave plate 21 within a prescribed range before and after any one of the position of not using polarizing sunglasses and the position of using polarizing sunglasses. For example, the controller 40 rotates the wave plate 21 toward one direction at a half angle within a prescribed range from the center within a prescribed range before and after any one of the position of not using polarizing sunglasses and the position of using polarizing sunglasses as the center, or rotates the wave plate 21 toward the other direction at a half angle within a prescribed range from the center. The controller 40 exemplified herein rotates the wave plate 21 in one direction from one side toward the other side of the prescribed range.

Herein, the position of not using polarizing sunglasses (origin) and the position of using polarizing sunglasses at the time of calculating the correction angle mean a rotational position at the time when the vehicle is assembled. Positioning corresponding to a design value may be performed in some cases, and position deviation from the design value may be caused in some cases. Thus, the pair of guide projections 25a and the pair of guide rails 25b are formed to be able to rotate the wave plate 21 at an angle equal to or larger than a total value of the rotation angle between the position of not using polarizing sunglasses and the position of using polarizing sunglasses (herein, 45 degrees), a rotation angle within a prescribed range at the time of calculating the correction angle, and a rotation angle corresponding to a maximum value of tolerance accumulation. For example, herein, the rotation angle within the prescribed range at the time of calculating the correction angle is assumed to be 30 degrees (that is, 15 degrees from any one of the position of not using polarizing sunglasses and the position of using polarizing sunglasses toward either side), and the rotation angle corresponding to the maximum value of tolerance accumulation is assumed to be 2 degrees. In this case, the pair of guide projections 25a and the pair of guide rails 25b are formed to be able to rotate the wave plate 21 by 77 degrees (45 degrees+30 degrees+2 degrees) or more from one end to the other end of the guide rail 25b.

The controller 40 obtains the correction angle based on imaging information of an imaging device (a camera and the like) 70 as follows. The imaging device 70 is set to transmit, at the position of the eye box EB, a principal component of transmitted light on the wave plate 21 at the rotational position of any one of the position of not using polarizing sunglasses and the position of using polarizing sunglasses. That is, the imaging device 70 is arranged at the position of the eye box EB. The imaging device 70 is set to transmit the principal component of transmitted light on the wave plate 21 at the rotational position of one of the position of not using polarizing sunglasses and the position of using polarizing sunglasses, for example, while preventing the principal component of the transmitted light on the wave plate 21 at the rotational position of the other one thereof from being transmitted. For example, as the imaging device 70, in a case of rotating the wave plate 21 within the prescribed range before and after the position of not using polarizing sunglasses, used is an imaging device on which a filter and the like having S polarized light transmission setting for transmitting S polarized light is mounted. For example, as the imaging device 70, in a case of rotating the wave plate 21 within the prescribed range before and after the position of using polarizing sunglasses, used is an imaging device on which a filter and the like having P polarized light transmission setting for transmitting P polarized light is mounted.

The controller 40 detects luminance values for each fixed rotation angle of the wave plate 21 within the prescribed range from the imaging information of the imaging device 70, and sets, as the correction angle, the rotation angle of the wave plate 21 corresponding to the maximum luminance value among the luminance values.

Herein, it is desirable that the controller 40 detects luminance values of common fixed point pixels in the imaging information for each fixed rotation angle of the wave plate 21, and sets, as the correction angle, the rotation angle of the wave plate 21 corresponding to the maximum luminance value among the luminance values. At least one fixed point pixel for determining position deviation is set in the imaging information. For example, in this case, the display 10 is caused to emit, as display light, a static image such as a monochrome solid image.

In a case in which there are a plurality of maximum luminance values in the luminance values, the controller 40 sets, as the correction angle, an average value of the rotation angles respectively indicating the maximum luminance values.

Figure 5:
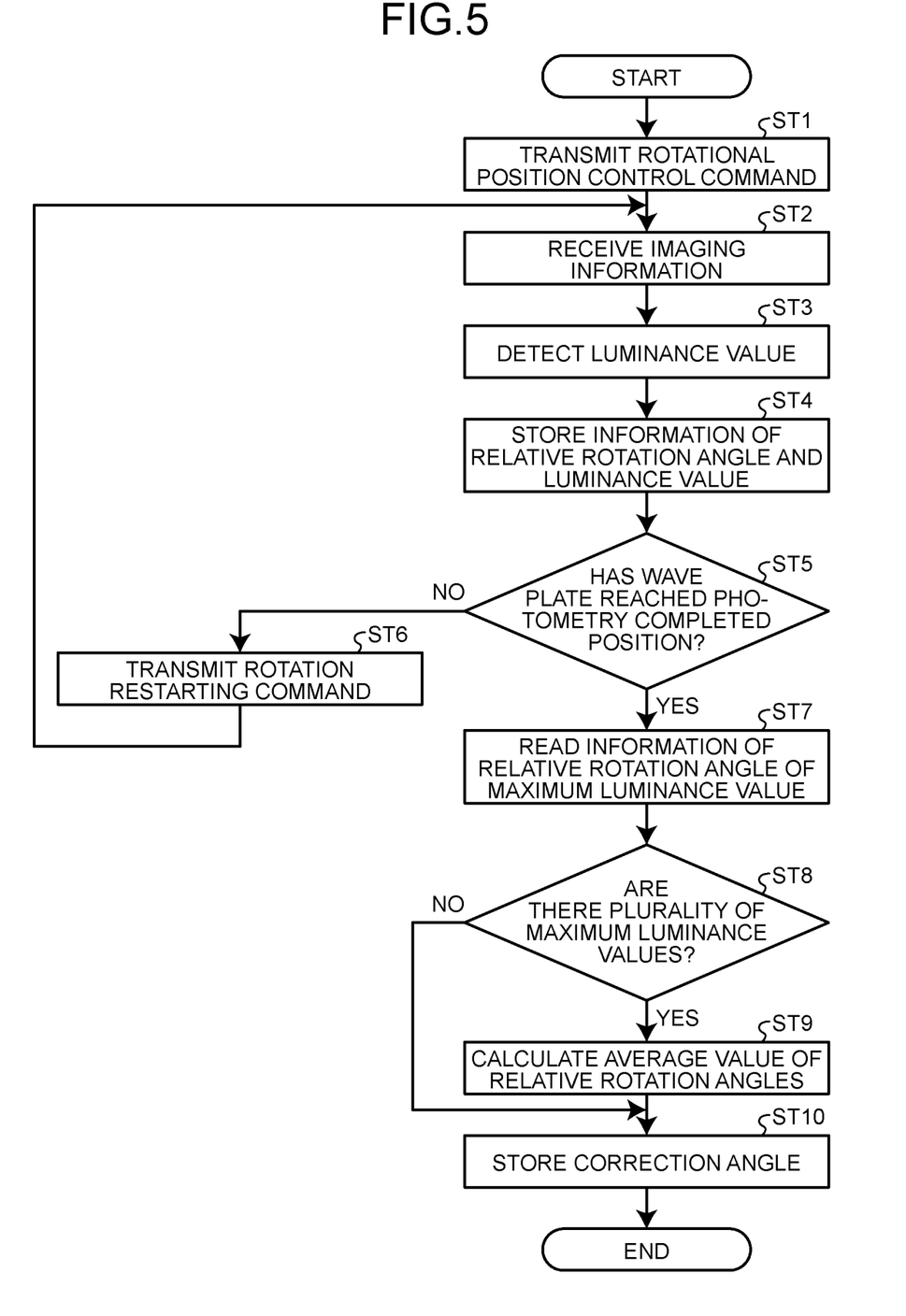
FIG. 5 is a flowchart for explaining operation of the display device for a vehicle according to the embodiment.

The following describes this control using the flowchart in FIG. 5.

The controller 40 gives a rotational position control command for the wave plate 21 to the electric motor 23 (Step ST1).

Figure 6:
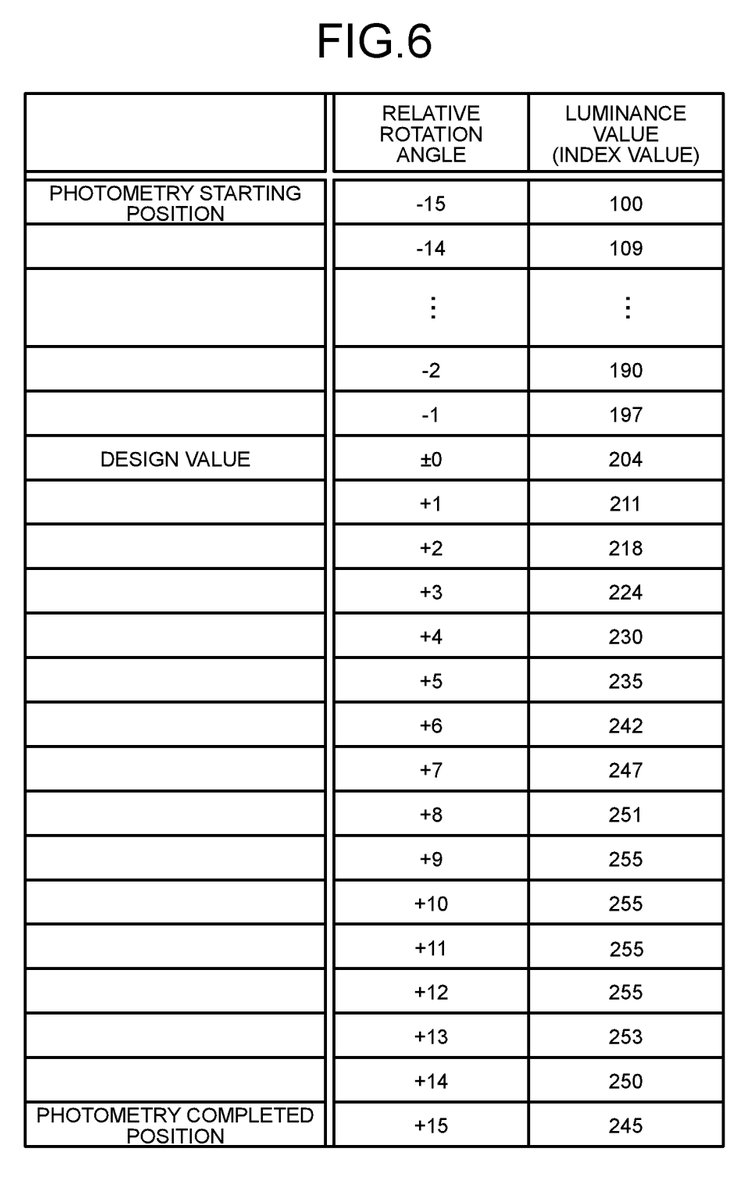
FIG. 6 is an explanatory diagram illustrating an example of photometric data.

In this example, the rotational position control command is given to rotate the wave plate 21 from the origin (position of not using polarizing sunglasses) to a photometry starting position, and rotate the wave plate 21 from the photometry starting position toward a photometry completed position at the other end on a side of the position of using polarizing sunglasses. Herein, the photometry starting position is assumed to be the position of the wave plate 21 rotated from the origin (position of not using polarizing sunglasses) to the opposite side of the position of using polarizing sunglasses by 15 degrees (FIG. 6). Herein, the photometry completed position is assumed to be the position of the wave plate 21 rotated from the position of using polarizing sunglasses to the opposite side of the position of not using polarizing sunglasses by 15 degrees (FIG. 6).

In this example, the rotational position control command is given to rotate the wave plate 21 for each fixed rotation angle (herein, 1 degree) from the photometry starting position to the photometry completed position. The rotational position control command may be a command for continuously rotating the wave plate 21 for each fixed rotation angle from the photometry starting position to the photometry completed position, or a command for stopping the wave plate 21 for each fixed rotation angle. Herein, the wave plate 21 is rotated by the fixed rotation angle to be stopped, and the wave plate 21 starts to be rotated by the fixed rotation angle again after a rotation restarting command is transmitted to the electric motor 23.

Subsequently, the controller 40 receives the imaging information of the imaging device 70 (Step ST2), and detects the luminance value of the fixed point pixel in the imaging information (Step ST3). For example, the controller 40 starts to receive the imaging information of the imaging device 70 at the time when the wave plate 21 reaches the photometry starting position. For example, the controller 40 receives the imaging information of the imaging device 70 every time the rotational position of the wave plate 21 is changed for each fixed rotation angle.

The controller 40 stores, in a random access memory (RAM), for example, information of a rotation angle relative to the origin of the wave plate 21 (hereinafter, referred to as a "relative rotation angle") and information of the luminance value of the fixed point pixel in the imaging information at this relative rotation angle (Step ST4). For example, the controller 40 indexes the luminance value to be stored in the RAM (FIG. 6). Herein, the luminance value at the time when the wave plate 21 is present at the photometry starting position is assumed to be 100, and a value relative thereto is stored for each fixed rotation angle.

The controller 40 determines whether the wave plate 21 has reached the photometry completed position (Step ST5), and if the wave plate 21 has not reached the photometry completed position, the process returns to Step ST2. Herein, if the wave plate 21 has not reached the photometry completed position, the rotation restarting command for the wave plate 21 is given to the electric motor 23 (Step ST6), and the process returns to Step ST2.

In a case in which the wave plate 21 has reached the photometry completed position, the controller 40 reads the relative rotation angle of the maximum luminance value from the information that is stored in the RAM at Step ST4 (Step ST7). The controller 40 then determines whether there are a plurality of the relative rotation angles of the maximum luminance value (Step ST8).

If there is only one relative rotation angle of the maximum luminance value, the controller 40 advances the process to Step ST10, and stores this relative rotation angle in the RAM as a correction angle. On the other hand, in a case in which there are a plurality of the relative rotation angles of the maximum luminance value, the controller 40 calculates an average value of the relative rotation angles indicating the maximum luminance value (Step ST9), advances the process to Step ST10, and stores the average value in the RAM as the correction angle. In this example, there are a plurality of the relative rotation angles of the maximum luminance value (+9 degrees to +12 degrees), so that an average value thereof (+10.5 degrees) is set to be the correction angle (FIG. 6).

The controller 40 performs rotational position control for the wave plate 21 in accordance with the required visual recognition mode using the information of the correction angle that has been set as described above.

Figure 7:
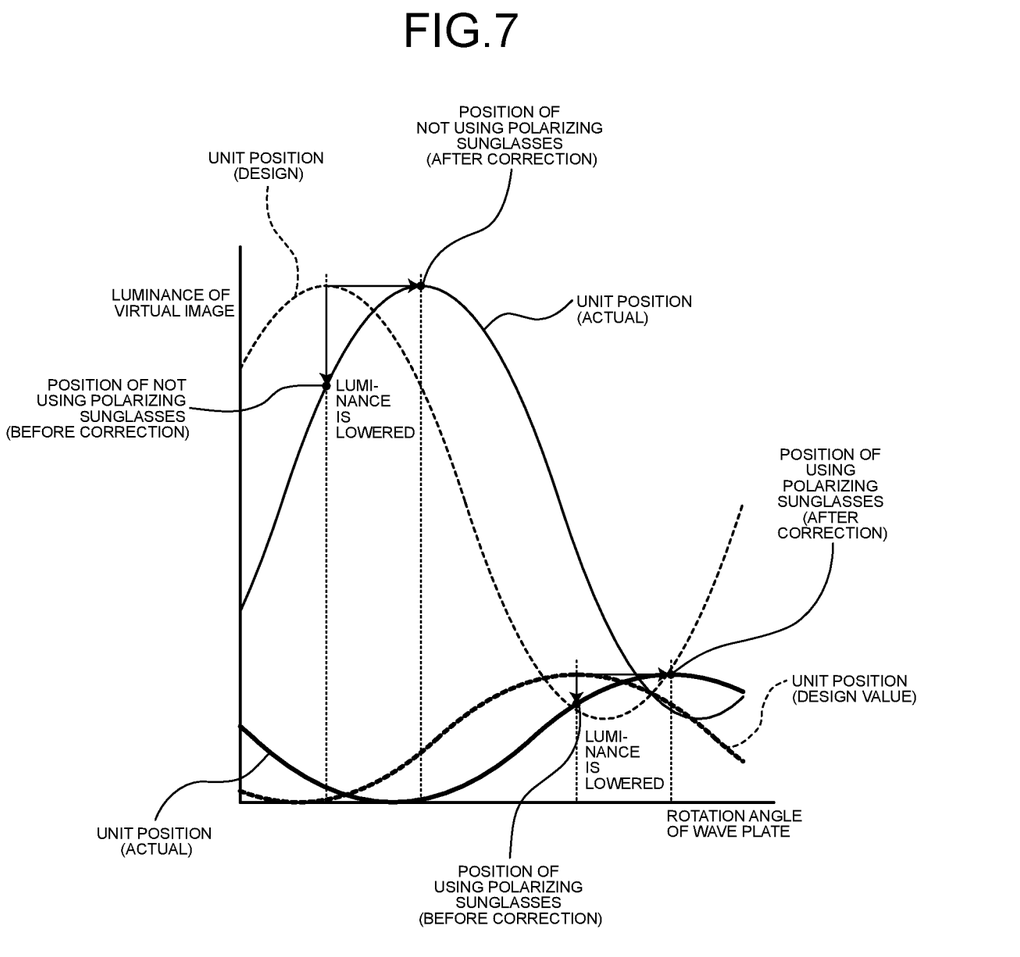
FIG. 7 is an explanatory diagram for explaining changes in luminance of a virtual image before and after correction.

In the display device 1 for a vehicle, in a case of rotating the wave plate 21 to the position of not using polarizing sunglasses before correction by the polarization switching unit 20 at an actual attachment position when the required visual recognition mode is the mode of not using polarizing sunglasses, the luminance of the virtual image is lowered as compared with a case of rotating the wave plate 21 to the position of not using polarizing sunglasses before correction by the polarization switching unit 20 that is estimated to be attached corresponding to the design value (FIG. 7). However, the controller 40 rotates the wave plate 21 to a rotational position obtained by adding the correction angle to the position of not using polarizing sunglasses when the required visual recognition mode is the mode of not using polarizing sunglasses. That is, the controller 40 rotates the wave plate 21 to the position of not using polarizing sunglasses after correction obtained by adding the correction angle to the position of not using polarizing sunglasses before correction when the required visual recognition mode is the mode of not using polarizing sunglasses. Thus, in the display device 1 for a vehicle, the luminance of the virtual image in the mode of not using polarizing sunglasses can be increased (FIG. 7).

In the display device 1 for a vehicle, in a case of rotating the wave plate 21 to the position of using polarizing sunglasses before correction by the polarization switching unit 20 at the actual attachment position when the required visual recognition mode is the mode of using polarizing sunglasses, the luminance of the virtual image is lowered as compared with a case of rotating the wave plate 21 to the position of using polarizing sunglasses before correction by the polarization switching unit 20 that is estimated to be attached corresponding to the design value (FIG. 7). However, the controller 40 rotates the wave plate 21 to a rotational position obtained by adding the correction angle to the position of using polarizing sunglasses when the required visual recognition mode is the mode of using polarizing sunglasses. That is, the controller 40 rotates the wave plate 21 to the position of using polarizing sunglasses after correction obtained by adding the correction angle to the position of using polarizing sunglasses before correction when the required visual recognition mode is the mode of using polarizing sunglasses. Thus, in the display device 1 for a vehicle, the luminance of the virtual image in the mode of using polarizing sunglasses can be increased (FIG. 7).

In this example, the origin before correction (position of not using polarizing sunglasses) is 0 degrees, and while the correction angle (+10.5 degrees) is taken into account, +10.5 degrees is set as the origin after correction (position of not using polarizing sunglasses). In this example, the position of using polarizing sunglasses before correction is 45 degrees, and while the correction angle (+10.5 degrees) is taken into account, +55.5 degrees is set as the position of using polarizing sunglasses after correction.

As described above, in the display device 1 for a vehicle, in a case of using the wave plate 21 at the position of not using polarizing sunglasses before correction in the mode of not using polarizing sunglasses, the luminance of the virtual image is lowered. However, by correcting the rotational position of the wave plate 21 to the position of not using polarizing sunglasses after correction, the virtual image can be displayed with high luminance. Furthermore, in the display device 1 for a vehicle, in a case of using the wave plate 21 at the position of using polarizing sunglasses before correction in the mode of using polarizing sunglasses, the luminance of the virtual image is lowered. However, by correcting the rotational position of the wave plate 21 to the position of using polarizing sunglasses after correction, the virtual image can be displayed with high luminance. In this way, the display device 1 for a vehicle according to the present embodiment can suppress deterioration of virtual image quality.

In the display device for a vehicle according to the present embodiment, in a case of using the wave plate at the position of not using polarizing sunglasses before correction in a mode of not using polarizing sunglasses, luminance of the virtual image is lowered. However, by correcting the rotational position of the wave plate to the position of not using polarizing sunglasses after correction while taking into account a correction angle, the virtual image can be displayed with high luminance. In the display device for a vehicle, in a case of using the wave plate at the position of using polarizing sunglasses before correction in a mode of using polarizing sunglasses, luminance of the virtual image is lowered. However, by correcting the rotational position of the wave plate to the position of using polarizing sunglasses after correction while taking into account a correction angle, the virtual image can be displayed with high luminance. In this way, the display device for a vehicle according to the present embodiment can suppress deterioration of virtual image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device for a vehicle, the display device comprising:
   a display configured to emit, as display light, display information to be visually recognized as a virtual image by an occupant in a compartment;
   a polarization switching unit configured to emit emission light from the display while switching a polarization direction between a mode of not using polarizing sunglasses in which the occupant is not using polarizing sunglasses and a mode of using polarizing sunglasses in which the occupant is using polarizing sunglasses;

a reflector configured to directly or indirectly receive the emission light from the polarization switching unit, and reflect the emission light toward an eye box as a visible range for a virtual image of the occupant; and a controller configured to control operation of the display and the polarization switching unit, wherein the polarization switching unit includes:

a wave plate rotatable between a position of not using polarizing sunglasses in the mode of not using polarizing sunglasses and a position of using polarizing sunglasses in the mode of using polarizing sunglasses, and configured to emit emission light of the display while changing a polarization direction; and a drive device using an electric motor driven and controlled by the controller as a driving source and configured to rotate the wave plate between the position of not using polarizing sunglasses in the mode of not using polarizing sunglasses and the position of using polarizing sunglasses in the mode of using polarizing sunglasses, wherein the wave plate emits light containing an S polarization component as a principal component if the wave plate is at the position of not using polarizing sunglasses, and the wave plate emits light containing a P polarization component as a principal component if the wave plate is at the position of using polarizing sunglasses, and the controller is configured to rotate the wave plate by a plurality of fixed rotation angles within a prescribed range that extends before and after any one of the position of not using polarizing sunglasses and the position of using polarizing sunglasses, detect a respective luminance value for each of the fixed rotation angles of the wave plate within the prescribed range from imaging information of an imaging device that transmits, at a position of the eye box, a principal component of transmitted light on the wave plate at each of the fixed rotation angles, and set, as a correction angle, a respective one of rotation angles of the wave plate corresponding to a maximum luminance value among the luminance values.

2. The display device for a vehicle according to claim 1, wherein in a case in which there are a plurality of the maximum luminance values in the luminance values, the controller sets, as the correction angle, an average value of the rotation angles respectively indicating the maximum luminance values.

3. The display device for a vehicle according to claim 1, wherein the controller detects a luminance value of a common fixed point pixel in the imaging information for each fixed rotation angle of the wave plate.

4. The display device for a vehicle according to claim 2, wherein the controller detects a luminance value of a common fixed point pixel in the imaging information for each fixed rotation angle of the wave plate.

5. The display device for a vehicle according to claim 3, wherein the display is caused to emit a static image as display light.

6. The display device for a vehicle according to claim 4, wherein the display is caused to emit a static image as display light.

7. The display device for a vehicle according to claim 1, wherein the controller rotates the wave plate to a rotational position obtained by adding the correction angle to the position of not using polarizing sunglasses when a required visual recognition mode is the mode of not using polarizing sunglasses, and rotates the wave plate to a rotational position obtained by adding the correction angle to the position of using polarizing sunglasses when the required visual recognition mode is the mode of using polarizing sunglasses.

8. The display device for a vehicle according to claim 2, wherein the controller rotates the wave plate to a rotational position obtained by adding the correction angle to the position of not using polarizing sunglasses when a required visual recognition mode is the mode of not using polarizing sunglasses, and rotates the wave plate to a rotational position obtained by adding the correction angle to the position of using polarizing sunglasses when the required visual recognition mode is the mode of using polarizing sunglasses.

* * * * *